March 7, 1967 L. ESAKI 3,308,351

SEMIMETAL PN JUNCTION DEVICES

Filed Oct. 14, 1963 3 Sheets-Sheet 1

INVENTOR
LEO ESAKI

BY John F. Ohland Jr.
ATTORNEY

March 7, 1967 L. ESAKI 3,308,351

SEMIMETAL PN JUNCTION DEVICES

Filed Oct. 14, 1963 3 Sheets-Sheet 2

March 7, 1967 L. ESAKI 3,308,351

SEMIMETAL PN JUNCTION DEVICES

Filed Oct. 14, 1963 3 Sheets-Sheet 3

United States Patent Office 3,308,351
Patented Mar. 7, 1967

3,308,351
SEMIMETAL PN JUNCTION DEVICES

Leo Esaki, Chappaqua, N.Y., assignor to International Business Machines Corporation, New York, N.Y., a corporation of New York Filed Oct. 14, 1963, Ser. No. 315,835
11 Claims. (Cl. 317—234)

This invention relates to electronic devices and, in particular, to solid state electronic devices comprising a crystalline body constituted of what are known as semimetals. The term semimetals includes elements of the second subgroup of the fifth group of the periodic table: bismuth, antimony, arsenic and binary and tertiary alloys of bismuth, antimony, and arsenic.

Although in the past materials have been classified roughly into the categories of metals, which are good conductors of electricity, semiconductors, and insulators, there is in addition a unique class of materials known as semimetals which possess properties and attributes differing from the above cited categories. The semimetals can by proper exploitation provide novel and desirable device capabilities.

It has been discovered that the semimetals can be so treated as to provide pn junctions within a crystalline body and, similarly to the case of semiconductor pn junctions, can be used effectively in signal translating devices. The semimetals, when so treated as to produce pn junctions, are capable of producing non-linear conductivity and thus, diodes, transistors and other solid state electronic devices can be realized therefrom.

The semimetals—bismuth, antimony and arsenic—may be utilized in various kinds of functional components such as switches, transducers, detectors, oscillators, harmonic generators, etc., some of which will provide operating features similar to those obtainable heretofore with semiconductor junction devices.

Although bismuth will be cited hereinafter as a specific example throughout the specification and emphasis will be placed on its unique features and capabilities, the invention embraces the other members of the class of semimetals equally well.

Acccordingly, it is a primary object of the present invention to provide a pn junction in a semimetal material.

A more specific object is to realize a pn junction device in the semimetal material, bismuth.

Another object is to construct diodes and transistors from the semimetals wherein pn junctions have been produced.

The foregoing and other objects, features and advantages of the invention will be apparent from the following more particular description of preferred embodiments of the invention, as illustrated in the accompanying drawings.

Before proceeding with the description of the basic electronic device of the present invention and the applications of this semimetal pn junction device for specific functional purposes, it is considered well to review briefly the electrical properties of semimetals. The electrical properties of semimetals are best described by invoking the band structure as will be done hereinafter, but there are other distinguishing properties which will be noted here.

Pure semimetals have equal numbers of holes and electrons existing in the semimetal at the same time: bismuth has $4\times10^{17}$ holes/cm.$^3$ and $4\times10^{17}$ electrons/cm.$^3$. This compares with about $4\times10^{22}$ carriers/cm.$^3$ for metals and between $10^{10}$–$10^{20}$ carriers/cm.$^3$ for semiconductors depending on the doping level. In very pure semimetals, and in particular for the case of bismuth, electrons have very low effective mass and exhibit anisotropy, that is, the electrons move more readily in certain directions throughout the crystalline body than in other directions. Electrons have a very high mobility in bismuth, on the order of $10^7$ cm.$^2$/volt sec. at low temperatures (2–4° K.) as compared with 3000 cm.$^2$/volt sec. mobility of germanium at room temperatures. The mean free path of electrons is likewise very long in bismuth, on the order of 2–3 mm. at the aforesaid low temperatures of operation, as compared with 100–1000 A. for germanium at room temperatures.

Figure 1A:
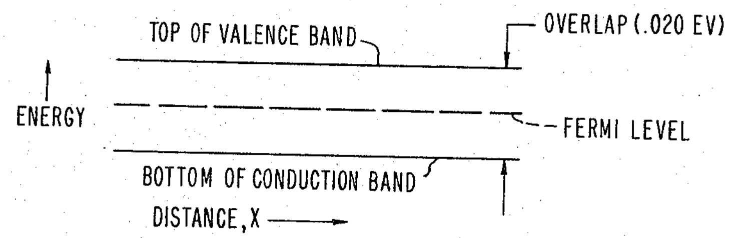
FIGURE 1A is an energy band diagram depicting the energy levels in a semimetal and illustrating the overlapping of the conduction and valence bands.

Referring now to FIGURE 1A, the energy band diagram for a pure semimetal is given. It will be seen that, similarly to the case of semiconductor materials, the conduction band and valence band edges are portrayed as solid lines in FIGURE 1A. The Fermi level, shown as a dotted line, is situated between the edges of the conduction and valence bands since the semimetal material is intrinsic. However, in contrast with normal semiconductor materials, as can be seen in FIGURE 1A, the valence band appears at the top of the diagram and the conduction band at the bottom. Thus, there is an overlapping of these bands rather than an energy gap between the valence and conduction bands. For bismuth, this overlapping is on the order of 0.020 electron volt and in a pure semimetal this gives rise to the equal numbers of holes and electrons which exist even at low temperatures in the almost filled valences and almost empty conduction bands respectively. The conduction mechanism for the intrinsic semimetal material may be appreciated by referring now to FIGURE 1B where there is portrrayed the energy states in what is known as momentum or $k$ space. As illustrated, the parabolas A and B, respectively, represent the energy states in the valence and conduction bands. The tips of the parabolas A and B correspond, respectively, to the valence band edge and conduction band edge depicted in FIGURE 1A. The hatched lines inside the parabolas A and B indicate that the energy states in the valence are almost entirely filled with electrons and the states in the conduction band are almost empty. Thus, what is portrayed is a situation where there has been a spilling over of electrons from the valence band to the conduction band. As is well known to those skilled in the art, it is a necessary condition for electronic conduction that the bands be only partly filled.

Figure 2A:
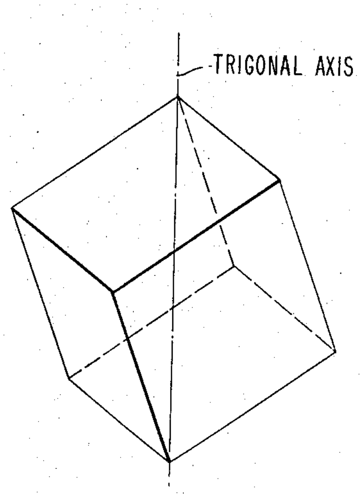
FIGURE 2A is a diagram of a crystal lattice of a semimetal such as bismuth illustrating schematically the rhombohedral structure thereof.
Figure 2B:
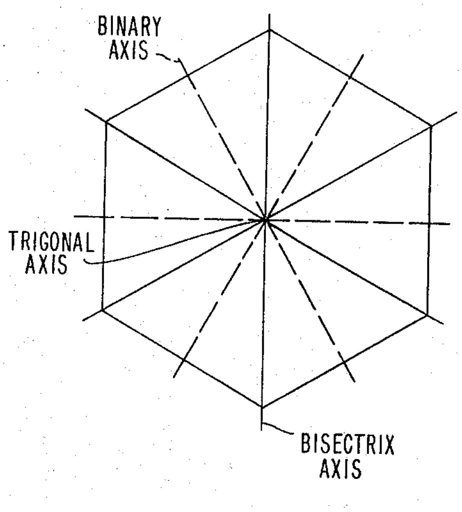
FIGURE 2B is a projection of the rhombohedral structure of FIGURE 2A showing it as a hexagon.

Referring now to FIGURES 2A and 2B there is shown a crystal lattice of a semimetal such as bismuth which has a rhombohedral structure. For a complete exposition of the crystallographic nature of such a semimetal element, reference may be had to page 123 (Electrons and Holes, by Zinman, Clarendon Press, Oxford University, 1960). In FIGURE 2A, the trigonal axis of the semimetal element is represented by the broken line drawn as a diagonal through the crystal lattice. In FIGURE 2B, there is shown a hexagon which represents a projection of the lattice structure of FIGURE 2A and at various points around the hexagon there are shown the binary axes, represented by the broken lines, and the bisectrix axes, represented by the light solid lines. A typical one of each of these axes has been labelled in FIGURE 2B. The trigonal axis in the view shown in FIGURE 2B is represented by the dot in the center. Further reference will be made to these various axes in later portions of the specification.

Figure 3:
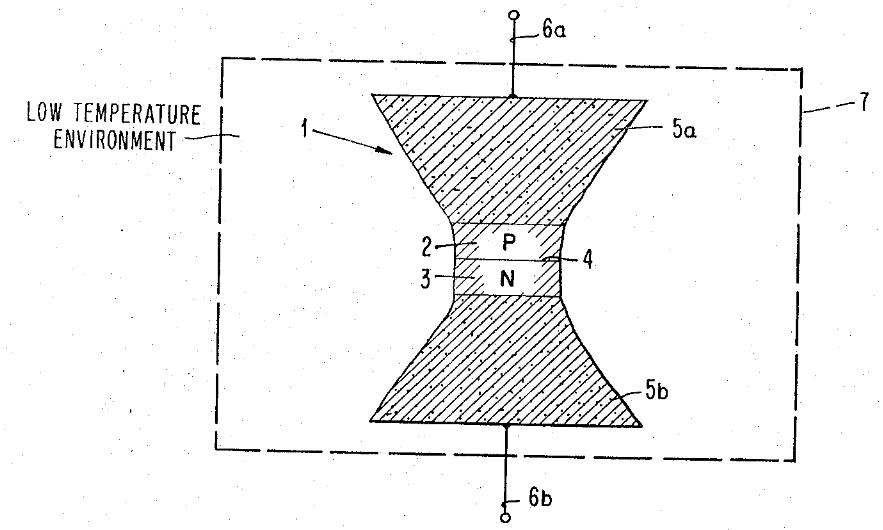
FIGURE 3 is a sectional view of one embodiment of the semimetal pn junction element of the present invention.

Referring now to FIGURE 3, there is shown one form of the semimetal junction device in accordance with the present invention. The complete structure is labelled 1 and the active device portion comprises p type conductivity region 2 and n conductivity region 3 which together define the pn junction 4. A preferred way of obtaining the physical construction for the device as shown in FIGURE 3 will be described. It will be noted first that very large ohmic contacts **5*a* and 5*b* are made to the active pn junction portion of the structure. These contacts are important in preventing damage to the active junction region in handling and use. Conductors 6*a* and 6*b* are soldered to the large area ohmic contacts 5*a* and 5*b*, respectively, for circuit connecting purposes. The box labelled 7 is representative of a low temperature environment that is used for the operation of semimetal element 1**. Such a low temperature environment would have temperatures on the order of liquid helium, that is 2–4° K. Means for providing such an environment are well known to those skilled in the art, specially to those skilled in the art of cryogenics wherein means such as Dewar flasks filled with liquid helium are conventionally employed.

The entire structure of the semimetal element 1 is achieved preferably by a technique known to those skilled in the art as the Czochralski crystal-pulling technique. The details of this technique may be appreciated by referring to Section 6–15 of The Handbook of Semiconductor Electronics, by Lloyd P. Hunter (McGraw-Hill, 1956). Using the aforesaid technique, a seed crystal is first carefully cut, preferably along a binary or bisectrix axis, and this seed crystal is mounted in a crystal holder. The seed crystal is lowered into a melt whose composition may be readily varied. Referring now to FIGURE 3, the p type conductivity region 2 is first grown in monocrystalline fashion onto the seed crystal as the latter is withdrawn from a melt. The melt includes a substitutional acceptor impurity taken from Group IV of the periodic table, such as tin. The predominance of the acceptor impurity produces in the p type region 2 a net concentration of carriers equal to $8\times10^{17}$ holes/cm.$^3$.

After the growth of the p type region 2 onto the seed crystal, the relatively large ohmic contact portion **5*a* is grown onto region 2. The contact 5*a* may be produced either substantially increasing the acceptor impurity concentration in the original crucible or by growing this portion 5*a* from a highly doped melt that is provided in a second crucible. After regions 2 and 5*a* have been thus formed the entire structure is then removed from the crystal holder and ohmic contact portion 5*a* is placed in the holder and growth of n type conductivity region 3 may proceed. This latter region is formed by using a substitutional donor impurity, such as tellurium or selenium from Group VI of the periodic table. The predominance of the donor impurity produces in the n type region 3 a net concentration of carriers equal to $8\times10^{17}$ electrons/cm.$^3$. Again, after formation of the active region 3, a large area ohmic contact 5*b*** is formed.

Although the basic method of producing junctions in a semimetal crystal body has thus been explained in the context of a melt growing operation, it will be understood by those skilled in the art that other techniques heretofore found useful in the formation of semiconductor junction devices can be followed. For example, one of these well-known techniques is the diffusion technique according to which an impurity, usually in the vapor state, is introduced into a container wherein a crystal body of one conductivity type is disposed. The impurity is selected so as to produce within the crystal body a zone or region of opposite conductivity type. Again, typical impurities useful for producing opposite conductivity types in the Group V semimetals are a Group IV impurity for achieving p type conductivity and a Group VI impurity for producing n type conductivity.

Figure 4:
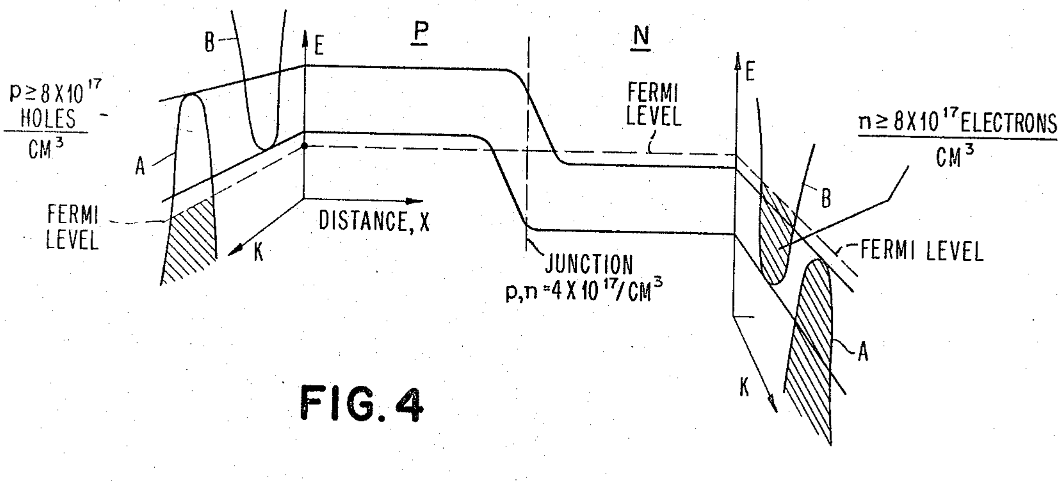
FIGURE 4 is an energy band diagram for a semimetal pn junction, at equilibrium, together with the bands in wave vector ($k$) space.

A description of the theory of conductivity in a semimetal pn junction will now be explained with particular reference to FIGURE 4 wherein is depicted an energy band diagram for a semimetal pn junction at equilibrium. In the diagram of FIGURE 4, the p type region corresponds to region 2 of the structure of FIGURE 3 and the n type conductivity region of FIGURE 4 corresponds to the region 3 in FIGURE 3.

Figure 1B:
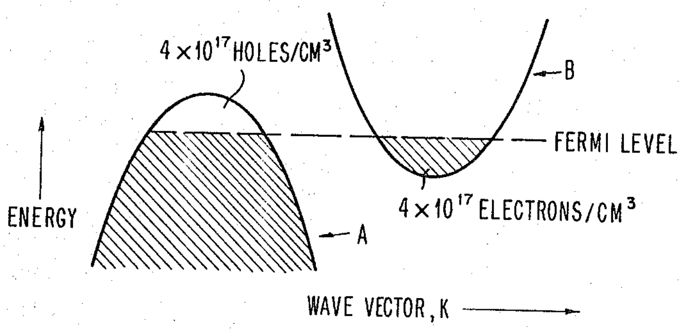
FIGURE 1B is a simplified portrayal of the energy states in momentum ($k$) space within a semimetal.

Generally speaking, for an interband transition or tunneling to occur, an electron has to absorb or emit a single phonon or a number of phonons (where the term phonon refers to a quantum of lattice vibration energy). Referring to FIGURE 1B, there is shown such overlapping of the conduction and valence bands in wave vector ($k$) space as to permit an interband transition or tunneling.

In contradistinction to the situation depicted in FIGURE 1B, there is an entirely different energy band picture shown in FIGURE 4. In this figure, where the pn junction is shown in energy band terms, it will be noted that the Fermi level on the p side has been shifted down below the conduction band edge. This shifting results from the fact that there has been compensation on the p side, typically by means of doping, effective to produce a hole concentration of approximately $8\times10^{17}$/cm.$^3$. In wave vector ($k$) space, it will be seen that the Fermi level has likewise been shifted down below the tip of parabola B and further down within parabola A. Thus, there is not the overlapping of filled and empty states as was seen in FIGURE 1B, although energy-wise there is the same overlapping of conduction and valence bands. Similarly, in the n type region, the Fermi level is shown above the top of the valence band edge resulting from an electron concentration of approximately $8\times10^{17}$/cm.$^3$. Since we are here considering the pn junction at equilibrium, the Fermi level is continuous throughout both the p and n type regions. In the wave vector ($k$) space portrayal for the n type region, the Fermi level is shown shifted upwardly so, again, there is not the kind of overlapping previously shown in FIGURE 1B.

For the pn junction depicted in FIGURE 4, ohmic conduction is exhibited almost all temperatures including room temperature (300° K.) if the pn junction is well formed. In other words, at almost all temperatures momentum transfer is very easy and thus, the illustrated pn junction acts simply as an ohmic element, the barrier separating the p and n region having no effect because $k$T is large. However, with low temperatures on the order of liquid helium (2–4° K.) and with reasonably good material, the pn junction depicted in energy band terms in FIGURE 4 exhibits non-linear conduction. It should be noted that conditions are set to prevent any interband transition so that the aforesaid nonlinear conduction results. Thus, momentum transfer is made difficult under the following prescribed conditions: (1) $kT<h\nu$ which implies that phonon-absorbed transitions are prohibited. (2) $eV<h\nu$ which means that phonon-emitted transitions are prohibited, where:

$k$=Boltzmann's constant.
$T$=the temperature in degrees Kelvin.
$\nu$=the frequency of the lattice phonons which are required for interband transitions.
$h=2\pi h$ where $h$ is Planck's constant.

Referring to the right hand portion of FIGURE 4, the parabolas illustrated in $k$ space in the n type region indicate that the only mobile electrons in the conduction band at the prescribed low temperatures cannot readily transfer to the valence band, and likewise, holes in the p type side, on the left in FIGURE 4, which are situated in the valence band, cannot readily transfer to the conduction band. This accounts for the fact that if the pn junction is biased in the reverse direction very high resistivity obtains, but if the pn junction is biased in the forward direction a condition of very low resistivity is present.

Figure 5A:
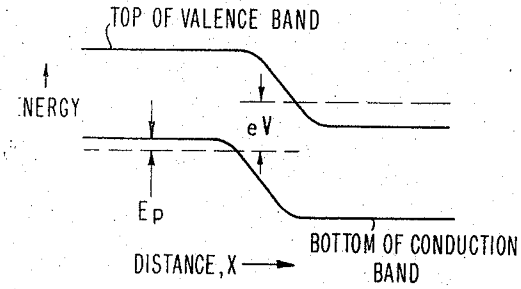
FIGURES 5A and 5B are energy band diagrams for the semimetal pn junction at forward bias and reverse bias, respectively.
Figure 5B:
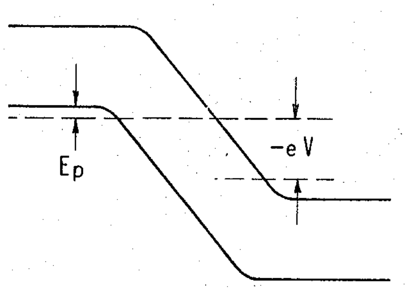

Referring now to FIGURES 5A and 5B, the energy band diagrams for forward and reverse bias application, respectively, are illustrated. It will be apparent that the energy difference labelled $e$V represents the shift in the Fermi level from its position at equilibrium to its position under bias conditions.

Figure 6:
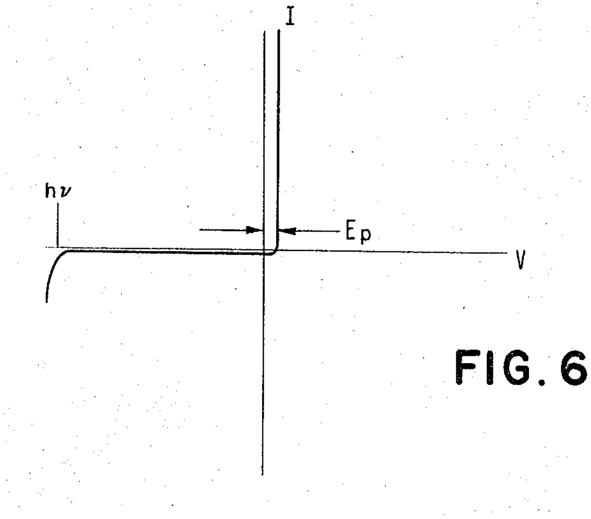
FIGURE 6 is a graph of the IV characteristic curve for a semimetal pn junction.

Referring to FIGURE 6 there is shown the complete IV characteristic for a typical pn junction in a semimetal wherein both the forward and reverse bias conditions are depicted. It will be understood that when a forward bias is applied such that the magnitude of $e$V is greater than E$p$ a very abrupt rise in conductivity will occur.

For the reverse bias case, portrayed in the energy band diagram of FIGURE 5B, the conductiivty will be extremely low, corresponding with the reverse bias direction of the IV characteristic in FIGURE 6. However, when $e$V approaches the value $h\nu$ in the reverse bias direction, phonon-emitted transitions are no longer prohibited, and consequently there is a sharp rise in conductivity.

Figure 7:
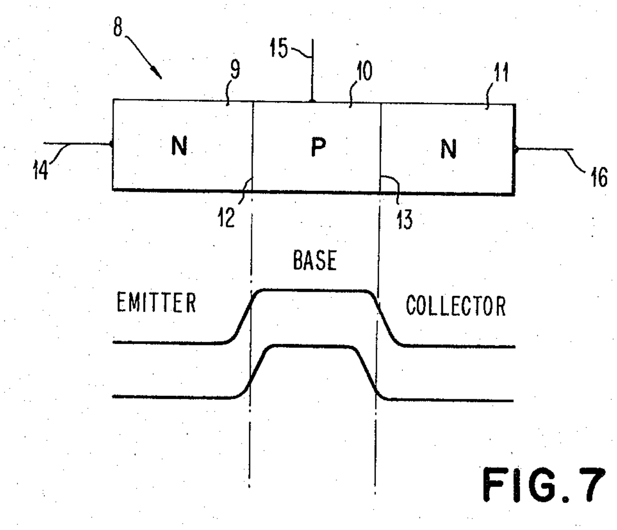
FIGURE 7 is a schematic diagram of a three zone semimetal junction device with its correlated energy band diagram.

Referring now to FIGURE 7 there is shown a schematic diagram of a three-zone semimetal junction device with its applicable energy band diagram immediately below. The device labelled 8 consists of regions 9, 10 and 11 alternating in conductivity type and defining two pn junctions 12 and 13. Electrodes 14, 15 and 16 are shown affixed to regions 9, 10 and 11, respectively, as circuit connecting means.

The device operation for the device of FIGURE 7 is essentially analogous to the basic operation of a semiconductor transistor. Minority carriers that are injected into the middle or base region 10 by the application of a suitable forward bias to the region 9 and 10 move over to the junction 13 between regions 10 and 11 where these minority carriers are collected and affect the current flow in an appropriate output circuit connected to regions 10 and 11. However, it will be appreciated that it is required that Fermi statistics be applied for a complete understanding of the details of operation of semimetal device, rather than Boltzmann's statistics. The ordinary treatment of the diffusion process may not be valid because of the extraordinary long mean free path involved in semimetal materials.

The operation of the device of FIGURE 7, due to the fact that it is fabricated of a Group V element, namely bismuth, antimony or arsenic, will be a few orders of magnitude faster than other transistors. Because the mean free path of electrons is very large they would be expected to pass unscattered through the p type region, for example, region 10 in FIGURE 7. In other words electron transfer from junction 12 to junction 13 is almost ballistic in nautre, therefore electron speed is determined by Fermi velocity. The transit time and probabilities are relaitvely independent of junction width and it is therefore estimated that Group V transistors of the nature of the device illustrated in FIGURE 7 will be $10^3$ times the normal 200 mc./sec. cut off frequency of presently known transistors.

It should also be noted that the junctions themselves within a semimetal junction device need not be narrow, and, thus, given a set of specifications, the collector capacitance may be made smaller for a semimetal junction transistor than for a semiconductor transistor. It should also be noted that in the specific example of the use of bismuth for fabricating a semimetal pn junction device, since bismuth is rhombohedral in its crystallographic structure, the conductivity therein is anisotropic and the most favorable axis along which to orient the direction of current flow is the binary axis.

What has been disclosed herein is a novel principle involving the discovery that the semimetals can exhibit nonlinear conductivity if prescribed conditions are satisfied and if they are suitably treated so as to provide, such as by doping, the proper concentration of current carriers within the crystalline body. Such discovery makes possible the development of diodes, transistors and other solid state electronic devices which may advantageously utilize the unique conductivity present in semimetal pn junctions.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An electronic device comprising a semimetal crystalline body having a first portion which serves as the active part of said device, said first portion being constituted of contiguous regions of opposite conductivity types defining a pn junction, second and third portions joined to opposite ends of said first portion as monocrystalline extensions thereof for providing ohmic contacts to said contiguous regions.

2. The invention as defined in claim 1 wherein the first region of said first portion is doped with selenium and the second region of said first portion is doped with tin to define said pn junction.

3. An electronic device comprising a semimetal crystalline body having first and second portions doped with an impurity material, said first and second portions being contiguous with and defining an intermediate portion of said semimetal body serving as the active part of the device, said intermediate portion being constituted of contiguous regions of opposite conductivity types defining a pn junction.

4. An electronic device as defined in claim 3 wherein said crystalline body is constituted of a semimetal selected from the group consisting of bismuth, antimony, arsenic and alloys formed of such elements.

5. An electron device as defined in claim 3 wherein said crystalline body is constituted of bismuth.

6. An electronic device comprising a crystalline body, said body being formed of a semimetal selected from the group consisting of bismuth, antimony, arsenic and alloys formed of such elements and having contiguous regions of alternate conductivity types.

7. A semimetal pn junction device comprising a crystalline body and circuit-connecting means affixed thereto, said body being constituted of a monocrystalline semimetal and having at least two contiguous regions of opposite conductivity types.

8. A device as defined in claim 7 wherein said circuit-connecting means are connected to said contiguous regions of opposite conductivity types.

9. The device as defined in claim 7 wherein said body is constituted of bismuth.

10. An electronic device comprising a semimetal crystalline body having at least three successive zones alternating in conductivity type and defining at least two pn junctions.

11. A semimetal pn junction device comprising a semimetal crystalline body having at least two contiguous regions, a first region having a hole concentration on the order of $8 \times 10^{17}/cm.^3$ with the Fermi level situated below the conduction band in said first region, a second region having an electron concentration on the order of $8 \times 10^{17}/cm.^3$ with the Fermi level situated above the valence band within said second region, said first and said second regions defining a pn junction.

References Cited by the Examiner

UNITED STATES PATENTS

| | | | |
|---|---|---|---|
| 2,882,195 | 5/1957 | Wernick | 148—171 |
| 2,882,467 | 5/1957 | Wernick | 148—33 |
| 3,217,378 | 3/1962 | Reusehel et al. | 29—25.3 |

OTHER REFERENCES

Handbook of Chemistry and Physics, Chemical Rubber Publishing Co., Cleveland, Ohio, 44th ed., pp. 406–408.

JOHN W. HUCKERT, *Primary Examiner.*

M. EDLOW, *Assistant Examiner.*